Oct. 22, 1940.       H. W. BROADY       2,218,671
AUTOMATICALLY VARIABLE POWER TRANSMISSION DEVICE
Original Filed Jan. 7, 1938
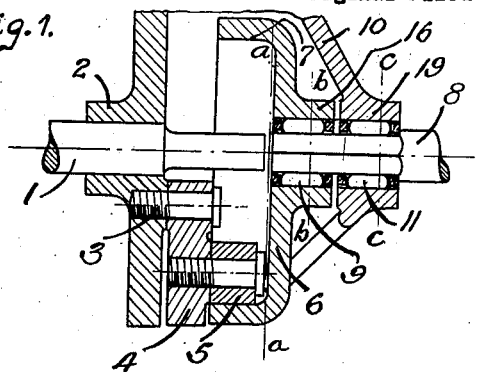
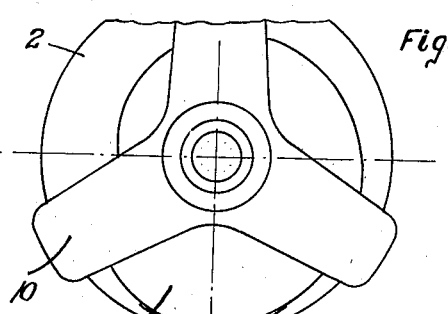
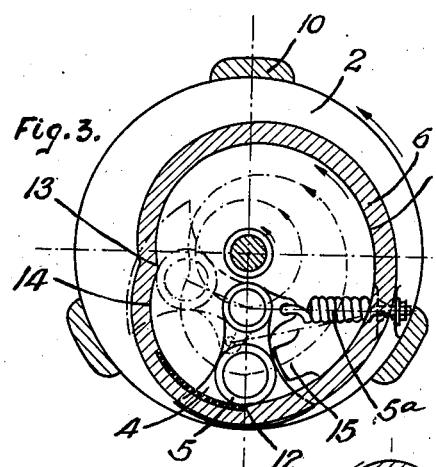
INVENTOR
Harry William Broady Patented Oct. 22, 1940

2,218,671

UNITED STATES PATENT OFFICE 2,218,671

AUTOMATICALLY VARIABLE POWER TRANSMISSION DEVICE

Harry William Broady, Latrobe, Pa.

Application January 7, 1938, Serial No. 183,902
Renewed March 8, 1940

10 Claims. (Cl. 74—64)

This invention relates to improvements in automatically variable power transmission device working on a dynamic principle, having a centrifugal weight rotating with a driving shaft and exerting a pressure on an eccentric member connected to a driven shaft.

One of the objects of this invention is to provide a power transmission which, when required, automatically varies its ratio to overcome a varying resistance and having an all positive one direction flow of power without any negative impulses requiring reversing means.

Another object of this invention is to provide such a transmission as the above with means allowing also a reversed power flow, i. e., from the driven shaft to the driving shaft, without cooperative action of the centrifugal weight and the eccentric member.

One form of this invention is illustrated in the accompanying drawing in which Figure 1 is a vertical section of the entire transmission; Figure 2, a front view of the transmission; Figure 3, a section of the transmission on the line $aa$, Figure 1; Figure 4 illustrates another form of this invention showing a section of a transmission having centrifugal weights movable radially in slots; Figure 5, a section of the first mentioned transmission on the line $bb$, Figure 1; Figure 6, a section of the same transmission on the line $cc$, Figure 1; Figure 7, a schematic diagram of the turning moment exerted by the rotating centrifugal weight on the eccentric member when the driven shaft is still at rest but just ready to start; Figure 8, a schematic diagram of said turning moment when the ratio between the driving shaft and the driven shaft is 2:1; Figure 9, a schematic diagram of the power flow through the transmission when said ratio is 1:1, i. e., direct drive when both shafts are turning with the same number of revolutions; Figure 10, a schematic diagram of said turning moments at the starting of the power flow in the transmission Figure 4; Figure 11, a schematic diagram of the positive and the negative turning moments at the starting of the power flow in a transmission with a reciprocating eccentric.

To the driving shaft 1 is secured the member 2 carrying on the fulcrum pin 3 the swinging centrifugal weight 4 with its roller 5 and spring 5a. The member 6 is provided with an inner inverted eccentric surface 7, which acts as a guide for the weight 4 when this is rotating with the driving shaft. The driven shaft 8 is connected to the member 6 by means of the one way friction clutch 9. Said shaft is also connected to the driving shaft by means of the member 10 connected to the member 2 and to the one way friction clutch 11 which acts on the driven shaft. The surface 7 has its outer beginning at point 12 and its inner end at point 13. 14 is the non-eccentric connecting surface between said two points. The lug 15 on the member 2 acts as a stopper for the weight 4. The part 16 of the member 6 constitutes the outer sleeve of the clutch 9, 17 is one of its friction rollers, and 18 is one of the friction surfaces on the shaft 8. The part 19 of the member 10 constitutes the outer sleeve of the clutch 11. 20 is one of its friction rollers, and 21 is one of the friction surfaces on the shaft 8.

The radial slot 22 constitutes guiding means for the sliding guide block 23 carrying the centrifugal weight 24, which in its turn is guided by the resilient steel ring 25 inside the member 26 and in contact with the inverted eccentric surface of the same and which surface begins at point 27 and ends at point 28. 29 is the space between the ring and the non-eccentric connecting surface of said member. 30 is a part of the member 26 and constitutes an inner guide for the centrifugal weight when this rotates at a low speed.

Each distance between the points $d, e, f, g, h$ on the diagrams, Figures 7 to 11, represents one complete revolution of the driving shaft. The vertical distance between a curve and its baseline at any given point represents the turning moment of the eccentric produced by the pressure from the centrifugal weight on the inverted eccentric surface when it passes said point in its rotation. 31 is the power curve just before the starting moment of the power flow, 32 is the power curve when the ratio between the driving shaft and the driven shaft is 2:1, and 33 is the power curve when they both turn at the same speed. These three power curves are representative for the type of transmission with one centrifugal weight shown in Figure 1. 34 represents the power curves for the type of transmission with more than one weight and with overlapping power periods shown in Figure 4. Said curves indicate the successively overlapping power periods just before the starting moment of the power flow and also the inactive intervals 35, 35 between the periods and during the outward movements of the centrifugal weights. 36 represents the power curve at a positive period of a transmission with a reciprocating eccentric actuated by a centrifugal weight mounted on the same, 37 is a power curve at a negative period of the same transmission, and 38, 38 are the inactive intervals between said power periods.

The centrifugal weight in this invention exerts, when rotating with the driving shaft at such a speed that the centrifugal force is greater than the gravity of the weight, a pressure on the inverted eccentric surface that may be divided into one force radial to the eccentric member and one force tangential to the same. This tangential force tends to rotate the eccentric and the driven shaft, when they are connected, in the same direction as the weight is rotating. A retarding force, caused by the resistance from the driven shaft, is always acting on the eccentric in opposite direction to the tangential force. The eccentric will remain at rest until the speed of the weight has increased to the point where the centrifugal force becomes greater than the gravity of the weight. At this point there is a change from the non-producing low speed period to the power transmitting ratio period which is followed by the direct drive. When the power influx is in excess of what is required for the starting of the eccentric then the speed of the same will increase causing an increase of the resistance and the retarding force until the latter and the tangential force are both alike. The ratio between the number of revolutions of the driving shaft and those of the driven shaft has automatically decreased to that required for equilibrium in the self-adjustable relation between the centrifugal weight and the eccentric member and which relation corresponds to the resistance and the power influx prevailing at that time. A change in the resistance, and of course also in the power influx, will immediately cause a change in the ratio to correspond to the new conditions. With an increasing resistance the ratio increases also and with a decreasing resistance the ratio decreases; vice versa with an increase or a decrease in the power influx; all until said equilibrium is attained. When the speed of the eccentric through either cause becomes the same as that of the weight then the ratio period is over and there is a direct drive, the ratio has thus decreased from nearly 1:0 at the start of the ratio period and the power transmitting to 1:1 at the direct drive.

In this invention the centrifugal weight may be of the swinging type, Figures 1 to 3, or of the sliding type, Figure 4, or any other suitable type. The swinging weight has the advantage that it is on account of its connection with the fulcrum pin 3 always under a certain control even when swinging free of the eccentric. The sliding weight has in its outward movement no such control until it is stopped in its outermost position and which may cause a blow if it is not taken care of by means of a spring or the like. The friction caused by a swinging weight is much less than that of the sliding weight. Several weights working successively in the transmitting of power are to be preferred to the use of one weight as it will give a more uniform flow of power especially if they are arranged for overlapping power periods. With several weights each one will be smaller and its center of gravity further out than at the single weight, the vibrations will be reduced and require smaller balancing means. The sliding weight arrangement will allow a greater number of weights to be used than with swinging weights and may therefore be the preferred arrangement.

The inverted eccentric surface has in its preferred form a small angle of incline at its outer end with a gradual and even increase all the way to its inner end. This will give the weight a smooth approach and an even run during its contact with said surface. The connecting surface, 14 and 29, may drop so abruptly and so far that the weight in its outward movement does not come in contact with the eccentric until it meets the inverted eccentric surface, or it may gradually slope down to said surface allowing during the whole or part of it contact by the weight. Such a contact must be extremely light so as to cause as little pressure from the weight as possible, preferable none at all. Any pressure on this dropping part of the eccentric produces a retarding force which will to some extent reduce the power flow and may cause vibrations. It is of course to great advantage to have as long active power transmitting periods and as short inactive periods as possible. Long power periods will produce a comparatively even power flow which will be still more improved by having several weights with overlapping power periods. This invention is most favourable for such an arrangement as it allows the inverted eccentric surface to reach practically all round the eccentric giving even at the start of the ratio period an almost uninterrupted power flow from each weight with very small insignificant interruptions when the weight moves to its outermost position. This is most noticeable by the lack of noise and vibrations at the start. There may also be arranged for two inverted eccentric surfaces, one on each side of the eccentric, both with their sets of centrifugal weights, the outer set being supported by a member connected to the driving shaft and reaching over the eccentric to its other side. This arrangement will allow more weights to be used and will therefore improve the power transmission.

It is preferable that the weight during the low speed period follows the course it takes when transmitting power. This may be accomplished by the help of a spring connecting the weight with the driving member as it is shown in Figure 3 where the spring 5a acts on the weight when this is forced by the inverted eccentric surface from its outermost position to follow said surface. This arrangement will prevent the weight from being without control during the low speed periods. Another arrangement to accomplish this is shown in Figure 4, where the recess is partly formed as a slot giving a central portion 39 which acts as a guide for the weight during the low speed periods. The recess has to be wider at its non-eccentric part so as to avoid at said part undesirable pressure by the weight on its outer surface. The central portion of the eccentric must be shaped so that the weight is not obstructed in its rotation during the low speed periods.

The swinging weight, when outward bound, must not be allowed to swing over too far as it may bind when reaching the eccentric surface, or be forced into a wrong position and thereafter cause damages. To prevent this a stopper 15, Figure 3, connected to the member 2 is provided and which will prevent the weight to swing further than to its outermost position. This can also be accomplished by means of a link arrangement and which may be combined with a spring ensuring the desired contact between the weight and the eccentric surface during the low speed periods. The stopper will also prevent the eccentric from turning faster than the driving shaft, as the weight will be, when the eccenter tends to turn faster, bound between the stopper and the connecting surface. It will further prevent the driving shaft and the eccentric from rotating in opposite direction to each other. In both these cases the two members will be forced either to a stand-still, or to turn together at the same speed and with one acting as a brake on the other. The stopper should be provided with a spring at the contact point so as to take up any possible blow from the weight.

The connecting surface may to its full length or part thereof be formed by a resilient material secured to the eccentric. Such a material will with its yielding surface prevent unfavorable retarding forces or blows from the outward bound weight. This material may be hard rubber, or fiber, or any other of the many suitable materials available. Even a curved spring of correct dimensions, shape, and resiliency may in its proper place be used as such a resilient material. Such a spring must have room for its deflection and the recess has to be shaped accordingly so as to give the required open space back of the spring. The spring may reach further than to the eccentric surface. It may even reach all round the recess and form an inner ring of flexible resilient steel guiding with its inner surface the rotating weight and taking up the pressure from the same and transferring it to the eccentric. The shape of the ring is such that it follows the inverted eccentric surface to the full length of the same and has the required open space back of it at the connecting surface. This arrangement will give the necessary transfer of pressure from the weight to the inverted eccentric surface and leave room for the sling-like deflection of the ring at the connecting surface. This deflection may reach into the eccentric surface, but it will follow the weight and the ring will regain its contact with said surface when the weight has reached the same. This will eliminate retarding forces at the connecting surface and give a very smooth run of the eccentric even when the power flow comes at short intervals or it changes direction continually as for instance in an automobile in a hilly country, this on account of the weight being all the time in contact with the guiding surface. Such a condition will not cause any disturbance or irritating noise.

With the driving shaft turning only in one direction and the power always running from the driving shaft to the driven shaft the eccentric member may be directly connected to the driven shaft. If however opposite conditions prevail as it is the case in an automobile where the engine sometimes back-fires and turns the wrong way, then there should be a one way driving connection 9, Figure 1, installed between the eccentric and the driven shaft connecting these two only when the power is flowing in its proper direction. This will prevent any possible damage at a sudden change in the direction of the power flow, or if the driving shaft starts off in the wrong direction and with a great influx of power. Under said conditions the eccentric will rotate alone with the weight and independent of the driven shaft. Such a free-running may however be dangerous in for instance an automobile running down-hill. The engine must in some other way be connected to the driven shaft so that it may act as a brake under such a downhill run. This is accomplished by the use of another one way driving connection 11, Figure 1, and which connects the driven shaft with the driving shaft without the help of the eccentric. The two one way driving connections must act in opposite direction to each other whereby one is always free when the other is engaged. There are different types of such connections as for instance a plain ratchet arrangement, or a one way friction clutch with rollers or balls. The roller type is shown on the drawing in the various figures. It is the best type as it requires a very limited movement compared with the ratchet arrangement and being more quiet than the latter. Figures 5 and 6 show how the two friction clutches act in opposite direction to each other. This action is accomplished by the help of springs in the roller cages pressing the rollers over to the transmitting side of the friction surface. When it is possible to have the driven shaft passing through the transmission to the driving shaft or to the member connected to the same, then the clutch connecting the two shafts directly to each other may be embodied with said member whereby the connecting member 10 may be eliminated.

It may sometimes be necessary to reduce as much as possible the time required for the power transmitting members to attain the previously mentioned equilibrium after a change in the resistance or the power influx. Automobiles especially require a quick pick-up and acceleration. There are two ways to accomplish this: either by increasing the centrifugal weight, or by making the spring $5a$ more powerful. As it is very important to keep down the weight of the eccentrically rotating centrifugal weight as much as it may be possible it is preferable to use for this purpose a more powerful spring than what is required for only obtaining contact between the weight and the eccentric surface at the low speed periods. Such a stronger spring does its active work only in one direction and that is when it adds its power to the centrifugal force of the weight when passing the eccentric surface whereby the turning moment on the eccentric is increased and the time required for attaining equilibrium is shortened. When the weight leaves the eccentric surface then the spring is released and strives to return to its starting position thereby cooperating with the outward bound weight and increasing the speed of the same, also shortening the duration of any contact there may be between the weight and the connecting surface, and the retarding force that may occur from said contact.

The diagrams show in a schematic way the power flow periods at different ratios and conditions. All the periods of this invention being positive with only very small and insignificant intervening inactive intervals. The power flow will therefore already at the start be relatively even especially if there are several weights with corresponding number of overlapping periods. The diagram, Figure 8, shows how the periods increase in length with an increasing speed of the eccentric relatively to that of the driving shaft until the length becomes infinite and the flow uninterrupted, Figure 9. The conditions under which the power transmission takes place with this invention are therefore extremely favourable in every respect. The vibrations will be comparatively insignificant even from the start and will require only small balancing means. The sound during the operation caused by the very few moving parts required will not be in any way disturbing. The weight of the complete device will be comparatively very small, and the same will be the case with the dimensions.

There are many fields in which this invention will become very useful. In automobiles this transmission will only require a simple manipulation with the gas-pedal to do all the gear-shifting and clutch work that has so far been required in the operation of a modern car. It will also be very useful as a regulating device between the source of power and the working machinery saving the same when the strain becomes too great for safety. Any type of reversing or other mechanism connected to this device will work well together with the same. This is due to its feature of adjusting itself automatically and instantaneously to any change in the resistance and in the power influx in such a way that the transmission reacts in a very smooth way on all outside parts connected to the same even if there should be a sudden and very big increase of power entering the transmission. Under ordinary conditions there will be no undue strain neither on said outside parts nor on the parts of the transmission device.

Dynamic transmission devices have been made previously to this invention, but they are of a fundamentally different type. They have an ordinary eccentric with a centrifugal weight mounted on the same and connected to the driving shaft. An eccentric of this type has two eccentric surfaces diametrically opposite each other, each constituting one half of the circumference. The turning force from the weight on the eccentric changes every time the weight moves from one surface to the other whereby the eccentric will have a reciprocating movement with alternating positive and negative power periods lasting as long as the revolutions of the eccentric and the driving shaft are not the same. This is illustrated in Figure 11, showing the alternating positive and negative periods at the starting of such a reciprocating type of transmission. The negative periods have to be either eliminated, which will give with the many and long interruptions an extremely poor power flow, or by the use of reversing means changed into positive power periods. With the latter arrangement there has to be one way driving connections between the eccentric and the parts actuated upon by the same, and also between the reversing means and the driven shaft. There will thus be at least three to four such connections, each being engaged or disengaged every time the eccentric changes direction of the power flow and which changing will last until the power flow stops or direct drive sets in.

These previous types of transmission devices, when compared with my invention, are very complicated in their construction and operation. They require many more and very expensive parts. Their weight is much bigger and the dimensions are larger. The many stops and starts of practically all the parts cause a severe strain on the material, and also vibrations and most disturbing noise. In an automobile the changes may run into one thousand per minute which means at least six thousand contacts for the friction rollers alone. Their power periods being only of half the length of mine will give twice as many interruptions and inactive intervals, the latter being of a considerable length due to the comparatively long time it takes for the friction rollers to engage and disengage. Their types will not allow the use of several overlapping weights and neither can the acceleration feature be embodied in their devices. It is for practical reasons impossible for them to provide for sufficient balancing means, especially to take care of the very strong vibrations by their types at the start. All these drawbacks are eliminated in my invention and which will therefore give a vastly superior transmission of power already from the start of the same.

The invention is not restricted to the forms of construction described herein, the principle of the invention may be carried out by other means without losing its character of an invention.

Having described my invention, I claim:

1. A power transmission with resistance controlled automatically variable ratio and all positive power periods having a driving shaft, a driven shaft, a member provided with a recess shaped as an inverted eccentric with a comparatively sharp drop outwardly from its inner end to its outer part, a one way automatically acting driving connection connecting aforesaid member to the driven shaft only when the latter is not turning faster than the member, a movable centrifugal weight connected to the driving shaft and guided, when rotating with said shaft, by the inverted eccentric surface on which it exerts a pressure tending to rotate the eccentric and the driven shaft, when these two are connected, at a ratio between the two shafts that overcomes the resistance.

2. A power transmission with resistance controlled automatically variable ratio and all positive power periods having a driving shaft, a driven shaft, a member connected to the latter and provided with a recess shaped as an inverted eccentric with a comparatively sharp drop outwardly from its inner end to its outer part, a movable centrifugal weight connected to the driving shaft and guided by the inverted eccentric surface on which it exerts, when rotating with said shaft, a pressure tending to rotate the eccentric and the driven shaft, when these are connected, at a ratio between the two shafts that overcomes the resistance, and a one way driving friction clutch acting automatically to connect the aforesaid member to the driven shaft only when the latter is turning faster than said member and also to prevent transmitting of power through the centrifugal connection when the driven shaft is turning faster than said member.

3. A power transmission with resistance controlled automatically variable ratio and overlapping all positive power periods having a driving shaft, a driven shaft, a member connected to the latter and provided with a recess shaped as an inverted eccentric with a comparatively sharp drop outwardly from its inner end to its outer part, a one way automatically acting driving connection connecting the aforesaid member to the driven shaft only when the latter is not turning faster than the member, movable centrifugal weights connected to the driving shaft and arranged so that they are guided, when rotating with said shaft, by the inverted eccentric surface and that more than one of them are at the same time in contact with said surface exerting on the same a pressure tending to rotate the eccentric and the driven shaft, when these are connected, at a ratio between the two shafts that overcomes the resistance and to produce a power flow evened by the overlapping of their individual power periods.

4. A power transmission with resistance controlled automatically variable ratio and all positive power periods having a driving shaft, a driven shaft, a one way automatically acting driving connection connecting said two shafts only when the driven shaft tends to turn faster than the driving shaft, a member provided with a recess shaped as an inverted eccentric with a comparatively sharp drop outwardly from its inner end to its outer part, a one way driving connection acting automatically and in opposite direction to the first mentioned driving connection and connecting aforesaid member with the driven shaft only when the latter is not turning faster than the member, a movable centrifugal weight connected to the driving shaft and guided, when rotating with said shaft, by the inverted eccentric surface on which it exerts a pressure tending to rotate the eccentric and the driven shaft, when these two are connected, at a ratio between the two shafts that overcomes the resistance.

5. A power transmission with resistance controlled automatically variable ratio and all positive power periods having a driving shaft, a driven shaft, a one way automatically acting driving friction clutch connecting said two shafts only when the driven shaft tends to turn faster than the driving shaft, a member provided with a recess shaped as an inverted eccentric with a comparatively sharp drop outwardly from its inner end to its outer part, a one way driving friction clutch acting automatically and in opposite direction to the first mentioned friction clutch and connecting the aforesaid member with the driven shaft only when the latter is not turning faster than the member, a movable centrifugal weight connected to the driving shaft and guided by the inverted eccentric surface on which it exerts, when rotating with said shaft at a speed producing a greater centrifugal force than the gravity of the weight, a pressure tending to rotate the eccentric and the driven shaft, when these are connected, at a ratio between the two shafts that overcomes the resistance.

6. A power transmission with resistance controlled automatically variable ratio and all positive power periods having a driving shaft, a driven shaft, a one way friction clutch connecting said two shafts when the driven shaft tends to turn faster than the driving shaft, a member provided with a recess shaped as an inverted eccentric with a comparatively sharp drop outwardly from its inner end to its outer part, a one way friction clutch acting in opposite direction to the first mentioned friction clutch and connecting the aforesaid member with the driven shaft when the latter is not turning faster than the member, a movable centrifugal weight connected to the driving shaft and guided by the inverted eccentric surface on which it exerts, when rotating with said shaft at a speed producing a greater centrifugal force than the gravity of the weight, a pressure tending to rotate the eccentric and the driven shaft, when these two are connected, at a ratio between the two shafts that overcomes the resistance, a spring connected to the weight compelling the latter, when it is rotating at a speed less than the aforesaid speed, to substantially follow the course it takes when exerting pressure on the inverted eccentric surface, and means preventing the weight after reaching its outermost position to move relatively to the driving shaft further in the direction of its rotary movement than to said position.

7. A power transmission with resistance controlled automatically variable ratio and all posi-
tive power periods having a driving shaft, a driven shaft, a one way automatically acting driving connection connecting said two shafts only when the driven shaft tends to turn faster than the driving shaft, a member provided with a recess shaped as an inverted eccentric with a comparatively sharp drop outwardly from its inner end to its outer part, a one way driving connection acting automatically and in opposite direction to the first mentioned driving connection and connecting the aforesaid member with the driven shaft only when the latter is not turning faster than the member, a swinging centrifugal weight connected to the driving shaft and guided, when rotating with said shaft, by the inverted eccentric surface on which it exerts a pressure tending to rotate the eccentric and the driven shaft, when these are connected, at a ratio between the two shafts that overcomes the resistance, stopping means connected to the driving shaft preventing the weight when reaching its outer position to swing over further than to said position.

8. A power transmission with resistance controlled automatically variable ratio and all positive power periods having a driving shaft, a driven shaft, a one way automatically acting driving connection connecting said two shafts only when the driven shaft tends to turn faster than the driving shaft, a member provided with a recess shaped as an inverted eccentric with a comparatively sharp drop outwardly from its inner end to its outer part, said dropping part of the recess substantially formed by a resilient material secured to the eccentric, a one way driving connection acting automatically and in opposite direction to the first mentioned driving connection and connecting the aforesaid member with the driven shaft only when the latter is not turning faster than the member, a movable centrifugal weight connected to the driving shaft and guided, when rotating with said shaft, by the inverted eccentric surface and to a minor extent by the resilient material, the weight exerting during its rotation a pressure on the inverted eccentric surface tending to rotate the eccentric and the driven shaft, when these are connected, at a ratio between the two shafts that overcomes the resistance.

9. A power transmission with resistance controlled automatically variable ratio and all positive power periods having a driving shaft, a driven shaft, a member connected to the latter and provided with a recess shaped as an inverted eccentric with a comparatively sharp drop outwardly from its inner end to its outer part, a curved spring of flexible steel in the form of a ring following all round the recess in contact with the same along the inverted eccentric surface and separated from the same by an open space opposite the outwardly dropping surface, a movable centrifugal weight connected to the driving shaft and guided, when rotating with said shaft, by the inner surface of said ring on which surface it exerts a pressure which is, when the weight passes the inverted eccentric surface, transferred to the same tending to rotate the eccentric and the driven shaft at a ratio between the two shafts that overcomes the resistance, the pressure from the weight in passing the outwardly dropping part of the recess is absorbed by the deflecting ring without causing retarding forces on the eccentric.

10. A power transmission with resistance controlled automatically variable ratio and all positive power periods having a driving shaft, a driven shaft, a member connected to the latter and provided with a recess shaped as an inverted eccentric with a comparatively sharp drop from its inner end to its outer part, a movable centrifugal weight connected to the driving shaft and guided by the inverted eccentric surface on which it, when rotating with said shaft, exerts a pressure tending to rotate the eccentric and the driven shaft at a ratio between the two shafts that overcomes the resistance, means connected to the weight and exerting on the same a force which produces from the start of its rotary movement an additional pressure on the inverted eccentric surface tending to rotate the eccentric the part of the recess connecting the ends of said surface shaped so that the weight in its outward movement does not exert a pressure on said part preventing the eccentric from turning in the same direction as the driving shaft.

HARRY WILLIAM BROADY.